Patented June 25, 1940

2,205,951

UNITED STATES PATENT OFFICE 2,205,951

METHOD OF PRODUCING NUCLEAR ALKYL DERIVATIVES OF PHENOLS

Jack D. Robinson, Snyder, N. Y., assignor to National Aniline & Chemical Company, Inc., New York, N. Y., a corporation of New York No Drawing. Application September 26, 1935, Serial No. 42,358

17 Claims. (Cl. 260—624)

This invention relates to improvements in the production of detergents. It relates more particularly to improvements in the production of nuclear alkyl derivatives of phenol and cresols for use in the production of sulfonated derivatives thereof useful as detergents, and specifically to improvements in the method of forming nuclear alkyl derivatives of phenol and cresols by the condensation of an alcohol containing at least 12 carbon atoms with phenol or a cresol with the aid of zinc chloride as a condensing agent.

Alkyl phenol sulfonates having the general formula

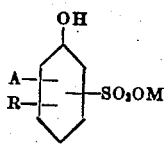

in which A represents hydrogen or a methyl group, R represents an alkyl hydrocarbon radical (saturated or unsaturated) containing 12 or more (preferably 12 to 23, and especially 14 to 19) carbon atoms, and M represents hydrogen or a metal, particularly an alkali metal, or an ammonium or organic ammonium radical, constitute an important class of synthetic detergent materials.

One important method of preparing them involves condensing phenol (hydroxybenzene) or a cresol (1.2-, 1.3- or 1.4-methylhydroxybenzene) with an alcohol containing at least 12 carbon atoms, more particularly 12 to 23 carbon atoms and especially 14 to 19 carbon atoms, and sulfonating the resulting alkyl phenol or cresol.

According to the present invention, the condensation of phenol or a cresol with an alcohol containing at least 12 carbon atoms is carried out with the aid of anhydrous zinc chloride and by heating the reaction mixture for a considerable period of time after it becomes turbid.

The production of lower alkyl phenols by heating a lower alcohol with phenol and zinc chloride is known. As usually carried out, a mixture of phenol, the alcohol and zinc chloride is heated until the mass, which originally is homogeneous, becomes heterogeneous or turbid, at which stage the reaction generally is considered to be complete and is discontinued.

I have found, when phenol or any of its monomethyl derivatives is heated with an alcohol containing at least 12 carbon atoms and anhydrous zinc chloride as condensing agent, the reaction mixture, which at first is normally homogeneous, upon continued heating also becomes turbid or heterogeneous. I have further found, while the combination of the higher alcohol with the phenol is largely effected prior to the development of turbidity and is not materially increased, or increased only to a minor extent, by further heating of the reaction mixture, the quality of the alkyl phenol product is materially improved by further heating for a considerable period of time. Thus, I have found the alkyl phenols resulting from the extended heating, when converted to alkyl phenol sulfonates, result in products of much superior detergent action as compared with those produced by heating merely to the stage of turbidity.

The proportion of alcohol employed with respect to the phenol may vary; but preferably the amount employed is such that not more than two alkyl radicals of the type represented by R in the foregoing formula, and preferably only one of said alkyl radicals, is contained in the resulting alkyl phenol. Thus, at least 1.25 mols of phenol per mol of alcohol is preferably employed in the condensation. A ratio as low as 1 to 1 may be employed, but the yield of the resulting alkyl phenol containing one alkyl radical of the said type represented by R will be less.

The amount of zinc chloride employed as condensing agent may vary. In general, the amount of zinc chloride may range from three-fourths to 1.5 times the weight of the alcohol employed. For best results an equal weight of the zinc chloride and the alcohol is employed. While the zinc chloride employed as condensing agent has been referred to as "anhydrous," it is noted that said condensing agent may be employed in a partially hydrated condition containing small amounts of water, for instance such as are absorbed from the surrounding atmosphere or otherwise in commercial operation, but insufficient to interfere with its action as a condensing agent.

The time during which the condensation reaction of the alcohol with the phenol may be carried out also may be varied. In general the reaction mixture becomes turbid in about 1 to 2 hours at refluxing temperature, and the heating is continued for a period of at least 3 to 4 hours at refluxing temperature after the mass has become turbid. While a product satisfactory as a detergent results from sulfonation of alkyl phenols produced by heating for about 5 hours at refluxing temperature, further improvement is obtained by continuing the heating for a total of at least ten hours at refluxing temperature. At lower temperatures a correspondingly longer period of time is preferably employed. The period of heating may be extended to 16 hours or more, at refluxing temperatures, without seriously harming the quality or substantially decreasing the yield of the alkyl phenol.

The invention will be illustrated by the following specific examples in which the parts are by weight and the temperatures are in degrees centigrade. It will be understood by those skilled in the art that the scope of the invention is not limited to these specific examples.

*Example 1.*—Equal parts of solid cetyl alcohol and anhydrous phenol are melted and mixed together. An amount of powdered anhydrous zinc chloride equal in weight to the cetyl alcohol is then added and the whole mass is refluxed with sufficient agitation to keep the zinc chloride in suspension, the temperature during the refluxing varying between 175° and 185°. After the heating and refluxing has continued for about 1 to 2 hours the mixture becomes turbid. The heating and refluxing is continued for a total period of 16 to 20 hours. The condensation reaction mass is cooled and allowed to stand sufficiently to set and settle the zinc chloride, the oily layer (crude cetyl phenol) is decanted and washed with one-third of its weight of hot water (80° to 90°) to decompose any zinc chloride complex or double salts. Any emulsion formed during the washing is broken by the addition of small quantities of sodium chloride. The washed oil is separated from water by stratification and is then distilled under a vacuum to purify it. The fraction of the distillate collected at 190° to 225° at 4 mm. pressure represents purified cetyl phenol. It is particularly adapted for the formation of a detergent by conversion to a sulfonated derivative.

*Example 2.*—100 parts of commercial cetyl alcohol (containing 30 to 40 per cent of normal cetyl alcohol, 30 to 40 per cent of higher alcohols than cetyl, such as stearyl alcohol, etc., about 10 per cent of normal lauryl alcohol and about 20 per cent of normal myristyl alcohol), 100 parts of phenol, and 100 parts anhydrous zinc chloride are heated at 160° to 180° under a reflux condenser, with agitation for 16 hours. The condensation product is washed with water until practically free from water soluble products. The resulting oil is fractionally distilled in vacuo. The fraction of the distillate which is collected between 195° and 240° at 15 mm. pressure of mercury is a faint yellow to water-white oil consisting chiefly of a mixture of alkyl phenols having the probable formula:

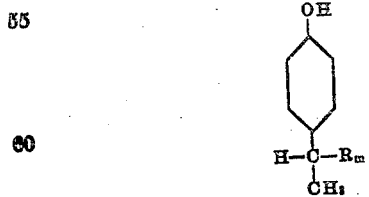

in which $R_m$ is a straight chain hydrocarbon radical having the formula $$C_{10}H_{21}, C_{12}H_{25}, C_{14}H_{29} \text{ or } C_{16}H_{33}$$

the compound in which $R_m$ is $C_{14}H_{29}$ predominating, with a small amount of normal alkyl phenols and probably some ortho isomers present.

*Example 3.*—100 parts of commercial cetyl alcohol, 100 parts of m-cresol and 100 parts of anhydrous zinc chloride are refluxed as in Example 2 for 6 hours. The resulting oil is washed with dilute hydrochloric acid and the washed oil is fractionally distilled in vacuo. The fraction of the distillate which is collected at 208° to 228° at 5 mm. pressure consists chiefly of a mixture of alkyl cresols in which the predominating compound is a secondary cetyl m-cresol.

*Example 4.*—100 parts of commercial lauryl alcohol (obtained by hydrogenation of fatty acids from cocoanut oil), 100 parts of phenol, and 100 parts of anhydrous zinc chloride are mixed and refluxed at 190° to 200° with agitation for about 16 hours. The condensation product is washed with water until practically free of water-soluble products, and the resulting oil is fractionally distilled in vacuo. The fraction of the distillate collected as a faint yellow to water-white oil between 210° to 230° at 13 mm. pressure consists chiefly of lauryl (dodecyl) phenols of which the probable formula of the principal constituent is

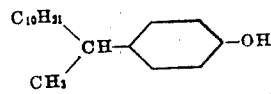

*Example 5.*—100 parts of octadecyl alcohol (stearyl alcohol), 100 parts of phenol, and 100 parts of anhydrous zinc chloride are mixed and refluxed for about 16 hours. The condensation product is washed with water till practically free of water-soluble products and the resulting oil is fractionally distilled in vacuo. The fraction of the distillate boiling between 235° to 270° at 14 mm. pressure is separately collected. It comprises chiefly para-octadecyl phenol having the probable formula

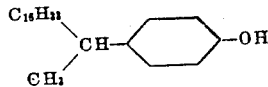

mixed with a small amount of normal octadecyl phenol and probably small amounts of the corresponding ortho isomers.

*Example 6.*—100 parts of commercial lauryl alcohol (obtained by hydrogenation of fatty acids derived from cocoanut oil and containing capryl, decyl, lauryl, myristyl, cetyl and stearyl alcohols), 100 parts of ortho-cresol and 100 parts of anhydrous zinc chloride are mixed, and refluxed at 190° to 200° with agitation for about 16 hours. The condensation product is washed with water until practically free of water-soluble products, and the resulting oil is fractionally distilled in vacuo. The fraction of the distillate collected between 215° and 230° at 13 mm. pressure is a faint yellow to water-white oil and consists of a mixture of alkyl substituted ortho cresols of which the principal components have the probable formulae:

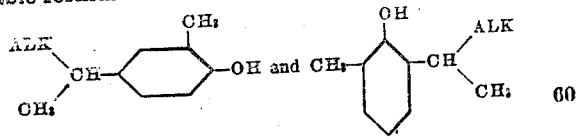

in which ALK is a straight chain alkyl hydrocarbon radical of the formulae $C_6H_{13}$, $C_8H_{17}$, $C_{10}H_{21}$, $C_{12}H_{25}$, $C_{14}H_{29}$ or $C_{16}H_{33}$. The average molecular weight corresponds with a product in which the chain represented by ALK has approximately the formula $C_{10}H_{21}$.

*Example 7.*—Cresylic acid (a commercial mixture of cresols) is substituted for the ortho-cresol of Example 6. The fraction of the distillate boiling between 215°–240° at 13 mm. mercury pressure is separately collected. It is a faint yellow to water-white oil comprising a mixture of long chain alkyl derivatives of ortho-, meta-, and para-cresol.

The use of the products of the above examples in the making of alkyl phenol sulfonates for use as detergents is illustrated by the following additional examples of which the parts are also by weight, and the temperatures are also in degrees centigrade.

*Example 8.*—To 30 parts of purified cetyl phenol (obtained, for example, in accordance with the procedure of Example 1) 36 parts by weight of 100% sulfuric acid are added with sufficient agitation to insure thorough mixing without aerating the mass; the temperature of the mass being maintained below 50°, and the sulfuric acid being added gradually (over a period of about 5 minutes) so as to avoid exceeding this temperature. The mass is further agitated while preventing the temperature from exceeding 50° until the desired sulfonation has been attained (for example, for an additional period of a half hour). Upon completion of the sulfonation, the sulfonation reaction mixture is poured with stirring into 275 parts of water containing 23 parts of sodium hydroxide, the addition being sufficiently gradual to avoid rise in the temperature of the resulting solution above 60°. There is thus obtained sodium cetyl phenol sulfonate in an aqueous solution containing sodium sulfate in a considerable amount. The resulting solution is dried on an atmospheric rotary drum drier heated with steam at 40 to 50 pounds pressure, the product being scraped from the rolls in a granular to flake-like or powdered form.

As above indicated, changes may be made in the processes hereinbefore described without departing from the scope of the invention.

Thus, phenol, ortho-, meta-, or para-cresol or their mixtures may be employed.

The process may be carried out with non-aromatic alcohols of various types, containing at least 12 carbon atoms, such as straight-chain primary alcohols, straight-chain secondary alcohols, branched-chain primary alcohols, branched-chain secondary alcohols and tertiary alcohols of all types. As additional examples of alcohols which may be employed, the following are mentioned: pentadecyl alcohol obtained by condensing together 3 mol equivalents of amyl alcohol, tricosanol-7, dimethyl pentadecyl carbinol, and the mixture of tertiary alcohols resulting from the reaction of amyl magnesium bromide (Grignard reagent) with the isobutyl esters of the mixed fatty acids derived from cocoanut oil and hydrolysis of the reaction product.

As sulfonating agents there may be employed sulfuric acids of various strengths (e. g., 60° Bé. sulfuric acid, sulfuric acid monohydrate, oleum), chlorsulfonic acid, etc.

The sulfonation may be carried out in the presence or absence of an inert organic solvent or diluent and in the presence or absence of a sulfonation assistant. As solvents or diluents there may be employed any inert organic liquid which is not readily sulfonated, such as halogenated hydrocarbons of the aliphatic and aromatic series, as for example, carbon tetrachloride, dichlorethane, tetrachlorethane, dichlorbenzene, etc. As sulfonation assistants there may be employed the lower organic acids and/or their anhydrides, as for example, acetic acid, acetic anhydride, etc.

The temperature at which the sulfonation is carried out may vary within wide limits. For example, temperatures as low as about 0° C. and as high as about 140° C. may be employed. In general the more vigorous the sulfonating agent the lower is the preferred temperature. Ordinarily the completion of the sulfonation is carried out at a temperature in the neighborhood of about 70° to about 80° C. The ratio of sulfonating agent employed with respect to the alkyl phenol also may be varied. Thus, an amount of sulfuric acid or other sulfonating agent equivalent to from 1 to about 5 parts by weight of sulfuric acid monohydrate per part by weight of the alkyl phenol may be employed.

The extent to which the sulfonation is carried out may vary with the individual material being sulfonated and the use to be made of the sulfonated product. In general the extent of sulfonation of the alkyl phenol treated is such as to form chiefly the monosulfonic acid of the alkyl phenol, and to sulfonate impurities as well, if present.

The alkyl phenol sulfonates may be recovered in the form of their free sulfonic acids or in the form of salts of metals (as for example, of the alkali metals) or of organic bases, or of ammonia, etc. The salts may be obtained in any suitable manner, for example by reacting the sulfonated product, either in the crude form resulting from the sulfonation or in a purified form, with a metal oxide or hydroxide, ammonia or an organic base, or of a suitable salt of one of these, in an amount adapted to form a neutral product. Among the bases, oxides and salts which may be combined with the sulfonated products to produce salts useful as detergents and otherwise are, for example, sodium, potassium and ammonium hydroxides; sodium, potassium and ammonium carbonates and bicarbonates; ammonia; magnesium oxide; ethylamine; pyridine; triethanolamine; propanolamines; butanolamines; diamino propanol; ethylenediamine; triethylene tetramine, etc.

It will be understood that when an abnormally large quantity of phenol or cresol relative to the amount of alcohol is employed, or an excessive amount of zinc chloride is used, the latter may not completely dissolve in the reaction mixture to give a perfectly homogeneous solution. However, the liquid phase in the reaction mixture, i. e., the reaction solution or supernatant liquid in which the undissolved zinc chloride is present, will be homogeneous and will become turbid upon continued heating.

I claim:

1. The method of producing nuclear alkyl derivatives of phenols, which comprises heating at a condensation temperature a reaction mixture containing a phenol compound selected from the group consisting of phenol and its monomethyl derivatives, an aliphatic monohydric alcohol containing at least 12 carbon atoms, and zinc chloride as a condensing agent, and continuing the heating for a considerable period of time after the reaction mixture becomes turbid.

2. The method of producing nuclear alkyl derivatives of phenols, which comprises heating at a condensation temperature a reaction mixture containing a phenol compound selected from the group consisting of phenol and its monomethyl derivatives, a saturated aliphatic monohydric alcohol containing 12 to 23 carbon atoms, and zinc chloride as a condensing agent, and continuing the heating for a considerable period of time after the reaction solution becomes turbid.

3. The method of producing nuclear alkyl derivatives of phenols, which comprises heating at a condensation temperature a reaction mixture containing a phenol compound selected from the group consisting of phenol and its monomethyl derivatives, a saturated aliphatic monohydric alcohol containing 12 to 23 carbon atoms, and anhydrous zinc chloride, and continuing the heating for a considerable period of time after the reaction mixture becomes turbid, the weight of zinc chloride being from three-fourths to one and one-half of the weight of the alcohol.

4. The method of producing nuclear alkyl derivatives of phenols, which comprises heating under refluxing conditions a reaction mixture containing a phenol compound selected from the group consisting of phenol and its monomethyl derivatives, an aliphatic monohydric alcohol containing at least 12 carbon atoms, and anhydrous zinc chloride, and continuing the heating for a considerable period of time after the reaction mixture becomes turbid.

5. The method of producing nuclear alkyl derivatives of phenols, which comprises heating under reflux conditions a reaction mixture containing a phenol compound selected from the group consisting of phenol and its monomethyl derivatives, a saturated aliphatic monohydric alcohol containing at least 12 carbon atoms, and anhydrous zinc chloride, and continuing the heating for at least 2 hours after the reaction mixture has become turbid.

6. The method of producing nuclear alkyl derivatives of phenols, which comprises heating under reflux conditions a reaction mixture containing a phenol compound selected from the group consisting of phenol and its monomethyl derivatives, a saturated aliphatic monohydric alcohol containing 12 to 23 carbon atoms, and anhydrous zinc chloride, and continuing the heating for at least 2 hours after the reaction mixture has become turbid.

7. The method of producing nuclear alkyl derivatives of phenols, which comprises heating a reaction mixture containing a phenol compound selected from the group consisting of phenol and its monomethyl derivatives, a saturated aliphatic monohydric alcohol containing at least 12 carbon atoms, and anhydrous zinc chloride, for at least 5 hours under refluxing conditions.

8. The method of producing nuclear alkyl derivatives of phenols, which comprises heating under refluxing conditions a reaction mixture containing a phenol compound selected from the group consisting of phenol and its monomethyl derivatives, an aliphatic monohydric alcohol containing at least 12 carbon atoms, and anhydrous zinc chloride, and continuing the heating for a considerable period of time after the reaction mixture becomes turbid, the weight of zinc chloride being from three-fourths to one and one-half of the weight of the alcohol.

9. The method of producing nuclear alkyl derivatives of phenols, which comprises heating under refluxing conditions for 5 to 16 hours a reaction mixture containing a phenol compound selected from the group consisting of phenol and its monomethyl derivatives, a saturated aliphatic monohydric alcohol containing 12 to 23 carbon atoms, and anhydrous zinc chloride.

10. The method of producing nuclear alkyl derivatives of phenol, which comprises heating under refluxing conditions for a least 5 hours a reaction mixture containing phenol, a saturated aliphatic monohydric alcohol containing 14 to 19 carbon atoms, and anhydrous zinc chloride.

11. The method of producing nuclear alkyl derivatives of phenols, which comprises heating at a condensation temperature a reaction mixture containing a phenol compound selected from the group consisting of phenol and its monomethyl derivatives, an aliphatic monohydric alcohol containing at least 12 carbon atoms, and zinc chloride as a condensing agent, and continuing the heating for a considerable period of time after the reaction mixture becomes turbid, the amount of phenol compound being at least 1.25 mols per mol of the alcohol.

12. The method of producing nuclear alkyl derivatives of phenols, which comprises heating at a condensation temperature a reaction mixture containing a phenol compound selected from the group consisting of phenol and its monomethyl derivatives, a saturated aliphatic monohydric alcohol containing 12 to 23 carbon atoms, and anhydrous zinc chloride, and continuing the heating for a considerable period of time after the reaction mixture becomes turbid, the weight of zinc chloride being from three-fourths to one and one-half of the weight of the alcohol, the amount of phenol compund being at least 1.25 mols per mol of the alcohol.

13. The method of producing nuclear alkyl derivatives of phenols, which comprises heating under refluxing conditions for at least 10 hours a reaction mixture containing a phenol compound selected from the group consisting of phenol and its monomethyl derivatives, an aliphatic monohydric alcohol containing 12 to 23 carbon atoms, and anhydrous zinc chloride, the amount of phenol compound being at least 1.25 mols per mol of the alcohol.

14. The method of producing nuclear alkyl derivatives of phenols, which comprises heating under refluxing conditions for at least 5 hours a reaction mixture containing a phenol compound selected from the group consisting of phenol and its monomethyl derivatives, a saturated aliphatic monohydric alcohol containing 12 to 23 carbon atoms, and anhydrous zinc chloride, the weight of zinc chloride being substantially equal to the weight of the alcohol and the amount of phenol compound being at least 1.25 mols per mol of the alcohol.

15. The method of producing nuclear alkyl derivatives of phenol, which comprises heating under refluxing conditions for about 5 to 16 hours a reaction mixture containing phenol, a saturated aliphatic monohydric alcohol containing 14 to 19 carbon atoms and anhydrous zinc chloride, the weight of zinc chloride being substantially equal to the weight of the alcohol and the amount of phenol being at least 1.25 mols per mol of the alcohol.

16. The method of producing nuclear alkyl derivatives, which comprises heating under refluxing conditions for at least 10 hours a reaction mixture containing a phenol compound selected from the group consisting of phenol and its monomethyl derivatives, about an equal weight of a saturated aliphatic monohydric alcohol containing 12 to 23 carbon atoms, and anhydrous zinc chloride.

17. The method of producing nuclear alkyl derivatives of phenols, which comprises heating at a condensation temperature for a period of approximately 20 hours a reaction mixture containing a phenol compound selected from the group consisting of phenol and its monomethyl derivatives, an aliphatic monohydric alcohol containing at least 12 carbon atoms, and zinc chloride as a condensing agent.

JACK D. ROBINSON.